(12) United States Patent
Lager

(10) Patent No.: US 10,955,828 B2
(45) Date of Patent: Mar. 23, 2021

(54) METHOD AND A ROBOT SYSTEM FOR HANDLING OBJECTS

(71) Applicant: ABB Schweiz AG, Baden (CH)

(72) Inventor: Anders Lager, Västerås (SE)

(73) Assignee: ABB Schweiz AG, Baden (CH)

( * ) Notice: Subject to any disclaimer, the term of this patent is extended or adjusted under 35 U.S.C. 154(b) by 290 days.

(21) Appl. No.: 16/310,011

(22) PCT Filed: Jun. 14, 2016

(86) PCT No.: PCT/EP2016/063628
§ 371 (c)(1),
(2) Date: Dec. 14, 2018

(87) PCT Pub. No.: WO2017/215741
PCT Pub. Date: Dec. 21, 2017

(65) Prior Publication Data
US 2019/0184559 A1 Jun. 20, 2019

(51) Int. Cl.
| | | |
|---|---|---|
| G05B 19/418 | (2006.01) | |
| B25J 9/00 | (2006.01) | |
| B25J 9/16 | (2006.01) | |

(52) U.S. Cl.
CPC ........ G05B 19/4182 (2013.01); B25J 9/0093 (2013.01); B25J 9/1669 (2013.01);
(Continued)

(58) Field of Classification Search
CPC .............. B25J 9/0093; G05B 19/4182; G05B 19/41815; G05B 2219/39102; G05B 2219/40007
See application file for complete search history.

(56) References Cited

U.S. PATENT DOCUMENTS

| | | | |
|---|---|---|---|
| 8,417,363 B2 | 4/2013 | Erlandsson-Warvelin et al. | |
| 8,682,484 B2 | 3/2014 | Bellante | |
| 2016/0001983 A1* | 1/2016 | Ooba | G05B 19/4182 414/787 |

FOREIGN PATENT DOCUMENTS

| | | |
|---|---|---|
| EP | 1748339 A2 | 1/2007 |
| EP | 2233400 A1 | 9/2010 |
| (Continued) | | |

OTHER PUBLICATIONS

Humbert G. et al: "Comparative analysis of pick & place strategies for a multi-robot application", 2015 IEEE 20th Conference on Emerging Technologies & Factory Automation (ETFA), IEEE, Sep. 8, 2015: 8 pages.
(Continued)

*Primary Examiner* — Spencer D Patton
(74) *Attorney, Agent, or Firm* — Whitmyer IP Group LLC

(57) ABSTRACT

A computer implemented method and a system including at least one industrial robot arranged with a tool, and a conveyance path transferring a plurality of objects within a working area of the at least one robot. The computer implemented method includes obtaining position data indicating a position for each of the plurality of objects and applying a first strategy to the at least one robot. The first strategy includes: determining a value for each object within a certain area of the at least one robot, wherein the determination is based on the position data, and the value indicates a uniformity measure of the flow distribution in the direction of the conveyance path for the remaining objects within the certain area if the object, for which the value is determined for, was excluded from the conveyance path; determining a selected object within the working area of the
(Continued)

at least one robot based on the determined values; and controlling the at least one robot to handle the selected object.

17 Claims, 4 Drawing Sheets

(52) U.S. Cl.
CPC ... *B25J 9/1664* (2013.01); *G05B 2219/39102* (2013.01); *G05B 2219/40007* (2013.01); *Y02P 90/02* (2015.11)

(56) References Cited

FOREIGN PATENT DOCUMENTS

| EP | 2876065 A1 | 5/2015 |
| EP | 2876066 A1 | 5/2015 |

OTHER PUBLICATIONS

International Search Report and Written Opinion of the International Searching Authority Application No. PCT/EP2016/063628 Completed: Jan. 19, 2017; dated Jan. 30, 2017 13 pages.
Bozma H I L et al: "Multirobot coordination in pick-and-place tasks on a moving conveyor", Robotics and Computer Integrated Manufacturing, Elsevier Science Publishers BV. Barking, GB, Dec. 20, 2011: 10 pages.

* cited by examiner

METHOD AND A ROBOT SYSTEM FOR HANDLING OBJECTS

TECHNICAL FIELD

The present disclosure relates to the field of industrial robots, and to robot systems and methods for handling objects on a conveyance path. In particular, the disclosure relates to a system including at least one industrial robot arranged for handling objects on a conveyance path, and a method for handling objects on the conveyance path.

BACKGROUND

Industrial robots can be used to pick items from one location and place them at another location. The industrial robots often use a vision system to locate the items, and by correlating the coordinate system of the vision system with the robot coordinate system, the location of the items can be made known to the industrial robots such that the items can be found and picked by the robots. The items are transferred to another identified or previously known location.

In a multi robot system, items and empty places are often moved by conveyors passing by one or more robots. Items can be picked and empty places can be filled while they are inside a robot's working range. Each robot receives new pick and place locations continuously during the picking process. The positions of these can be random and the inflow rate can fluctuate. For every pick or place to be performed by a robot, a decision is taken in runtime on which item that shall be picked or which empty place that shall be used to place, i.e. filled. The decision is made among positions that will be within a reach of the robot at the time of handling the item or empty place. In the present description the term "object" is used to refer both to items and to empty places. When the robots are handling objects (e.g. picking or placing) on a common conveyor, the work load can be shared between the robots.

For efficiency of object handling, different object handling strategies may be implemented when handling objects with multiple robots from a common conveyor. In a first kind of strategy a fixed percentage of the objects are assigned to each robot. For example, the first object on the conveyance path is assigned to the first robot, the second object is assigned to the second robot etc. In a second kind of strategy, all objects are assigned to all robots. If an object then is handled by a robot, it becomes cancelled by the other robots. The second kind of strategy is often preferable since the flow handling is 100% redundant. If an object passes by a robot without being handled, for example due to a current overflow of items, due to the robot being occupied performing a different task, or due to the robot being in a stopped state, it can still be handled by any downstream robot.

However, the second kind of strategy also has some drawbacks. Typically, a robot operating according to the second kind of strategy handles the most downstream object within reach. As a consequence, the overflow is minimized from this robot. However, the overflow is not minimized from the multi robot system. The second kind of strategy is most efficient if the flow is uniformly distributed. A uniform flow is characterized by small variations in the separation distance between objects along the movement direction of the conveyor. With a uniform flow, the risk for overflow from a robot is decreased, since the available time for handling the next object, after handling a previous object, becomes stable. Since the robot will prioritize the most downstream objects, handling will, if there is an overflow from this robot, typically occur mainly in the downstream part of the working area of the robot. Therefore the outgoing overflow of objects from the robot on the conveyor typically remains substantially uniform if the conveyor velocity is stable and the time for handling an object also is stable.

With a fluctuating flow, the second kind of strategy will typically leave isolated heaps of clustered objects for the most downstream robot to handle. Since the objects are clustered, the time window for handling them all is small and the risk for overflow is increased. Between the heaps there are longer gaps that often cause extra standstill time when the robot has to wait for the next object to come within reach.

Often the first kind of strategy gives a better performance than the second kind of strategy when operating on a fluctuating flow. However, the need for redundant object handling often makes the second kind of strategy the preferred option.

In EP2876066A1 the problem of uneven workload among a plurality of robots along a conveyance path is mentioned. The problem is here solved by calculating a workload score for a robot for each article depending on the distance between the robot and each article on a conveyance path. The longer the distance, the higher the score. The articles are then distributed to the robots such that the sum of the scores becomes equal for each robot.

SUMMARY

It is an objective of the disclosure to alleviate at least some of the drawbacks with the prior art. It is a further objective of the disclosure to provide a more efficient robot implemented method for handling objects on a conveyance path than prior known methods. In particular, it is an objective of the disclosure to provide a redundant handling method for a robot system that is more efficient than prior known redundant handling methods.

These object and others are at least partly achieved by the method and the system according to the independent claims, and by the embodiments according to the dependent claims.

According to one aspect, the disclosure relates to a computer implemented method for a system including at least one industrial robot arranged with a tool, and a conveyance path transferring a plurality of objects within a working area of the at least one robot. The computer implemented method includes obtaining position data indicating a position for each of the plurality of objects, and applying a first strategy to the at least one robot. The first strategy includes:

determining a value for each object within a certain area. The determination is based on the position data, and the value indicates a uniformity measure of the flow distribution in a direction of the conveyance path for the remaining objects within the certain area if the object, for which the value is determined for, was excluded from the conveyance path;

determining a selected object within the working area of the at least one robot based on the determined values;

controlling the at least one robot to handle the selected object.

With the method, the outgoing flow from the robot becomes more uniform than the outgoing flow when using other handling strategies, which will enable an overall less overflow and higher handling rate of a system with a plurality of robots. Also, when using the method, the outgoing flow from the robot most often becomes more uniform than the ingoing flow to the robot.

The incoming flow to the first robot in the system can be uniform or fluctuating. Typically, the system cannot affect the distribution of the incoming flow. However, the outgoing flow after each robot is affected by every performed handling. The method significantly reduce the overflow for systems, e.g. picking systems, including a plurality of industrial robots, that uses redundant flow handling compared to current techniques for a fluctuating flow of objects to be handled.

Generally, by making upstream robots prioritize those objects that makes the outgoing flow from the robot more uniform, the handling rate for the downstream robots is increased while maintaining the handling rate for upstream robots.

The method may be implemented to an already existing handling system, e.g. a picking system, and is easy to use, to explain and to understand. The performance of the overall system may be improved. In simulations it has been shown that the method gives an improved performance to fluctuating flows compared to existing methods for fluctuating flows.

According to one embodiment, the method includes saving the position data and updating the position data when a selected object has been handled such that the position data always includes only the positions for objects not previously being handled.

According to one embodiment, the method includes determining the selected object within the working area of the at least one robot to be the object whose exclusion gives the most uniform flow distribution in the direction of the conveyance path for the remaining objects within the certain area based on the determined values.

According to one embodiment, the method includes repeatedly making the at least one robot perform the steps of the first strategy.

According to one embodiment, the system includes a most downstream robot in relation to the direction of the respective conveyance path, wherein the method includes applying a second strategy to the most downstream robot, the second strategy being different from the first strategy.

According to one embodiment, the method includes always prioritizing the most downstream object in the working area of the most downstream robot.

According to one embodiment, the determining a value for each object includes:
determining distances d1+dX, d2 . . . d(X−1) between objects in the direction of the respective conveyance path from the position data; and
calculating a variance of the distances d1+dX, d2 . . . d(X−1) for each object, if the object, for which the value is determined for, was excluded from the conveyance path; and
wherein the determining the selected object includes:
comparing the plurality of values; and
determining the object with the lowest value to be the selected object.

According to one embodiment, the method includes applying the first strategy separately to different conveyance paths for the same at least one robot.

According to a second aspect, the disclosure relates to a system including at least one industrial robot arranged with a tool; a conveyance path arranged for transfer of a plurality of objects within a working area of the at least one robot and a control system including processing means and memory means. The control system is arranged to obtain position data indicating a position for each of the plurality of objects, and to execute the method according to any of the method steps as disclosed herein.

According to one embodiment, the system includes a sensor system arranged to monitor the conveyance path, generate sensor data indicating each of the plurality of objects and send the sensor data to the control system. The control system is further configured to determine positions for each of the plurality of objects based on the sensor data, and generate the position data indicating the positions.

According to one embodiment, the system includes a controller with a processor and a memory, wherein the controller is configured to obtain the position data, to determine the selected objects and to determine coordinates for the same.

DETAILED DESCRIPTION

Figure 1:
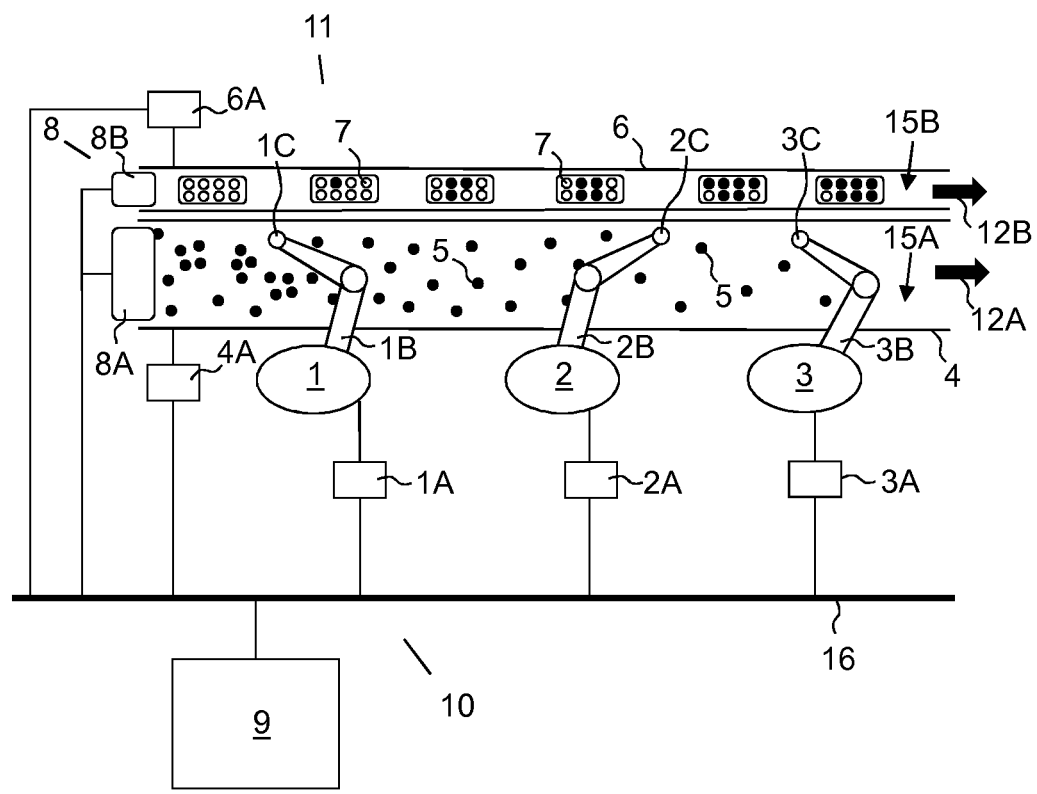
FIG. 1 illustrates a system with a plurality of industrial robots arranged along two conveyors according to one embodiment of the disclosure.

In FIG. 1 a robot system 11 with a plurality of industrial robots 1, 2, 3 is shown. An industrial robot is here defined to be a robot that can be automatically controlled, that is reprogrammable, that can adopt to a multitude of tasks and has three or more axes. Each industrial robot 1, 2, 3, hereinafter referred to as a robot, is arranged with a robot controller 1A, 2A, 3A, a robot arm 1B, 2B, 3B, and a tool 1C, 2C, 3C. Each tool 1C, 2C, 3C is attached to an end effector of a robot, respectively. A tool 1C, 2C, 3C may e.g. be a gripper, a suction tool or a processing tool. Each robot controller 1A, 2A, 3A includes a processor 13 and a memory 14 (FIG. 2), and may be arranged to control a robot according to input data to the robot controller 1A, 2A, 3A indicating a position or a coordinate of an object 5, 7. An object may be an item 5 or an empty place 7. In response to the input data, the robot controller 1A, 2A, 3A is arranged to execute a computer program P and generate control signals to the various actuators of the robot such that the tool 1C, 2C, 3C of the robot handles the object 5, 7, e.g. picks, processes or releases an item 5 at the position or coordinate. The computer program of the robot controller 1A, 2A, 3A may include instructions of where different conveyance paths 4, 6 are located, and what the robot shall do to the objects 5, 7 on the different conveyance paths 4, 6. For example, the instructions may include that if the object 5, 7 is located on a first conveyance path 4, it shall be picked. The instructions may further include that if the object 5, 7 is located on a second conveyance path 6, it shall be filled. Instead, the input data to the robot controllers 1A, 2A, 3A may also define what the robot shall do at a position, e.g. pick, process or fill.

The robot arm 1B, 2B, 3B may be a single chain arm. The robot may have six degrees of freedom. Alternatively, the robot may be a special kind of picking robot where the arm 1B, 2B, 3B is implemented as a plurality of legs all arranged to the same tool 1C, 2C, 3C. The robot may also be a dual-arm robot where each arm of the robot may be controlled according to a certain separate strategy as will be explained in the following.

Figure 5:
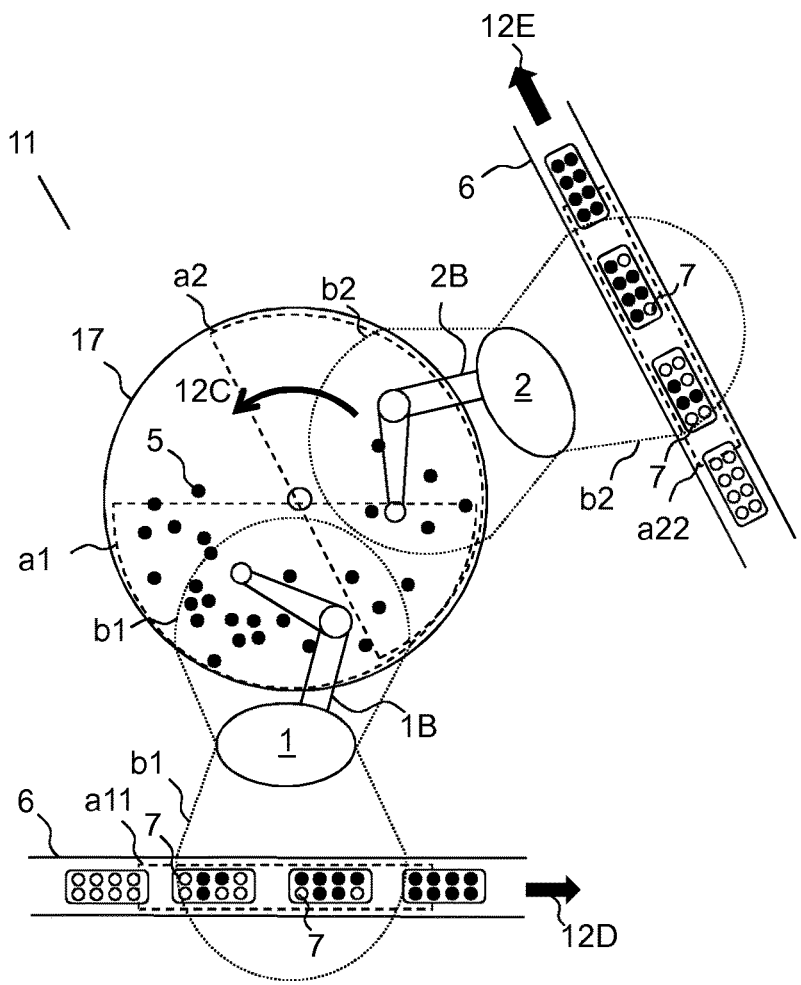
FIG. 5 illustrates examples of working areas and certain areas of another system with a plurality of industrial robots and a circular conveyor.
Figure 6:
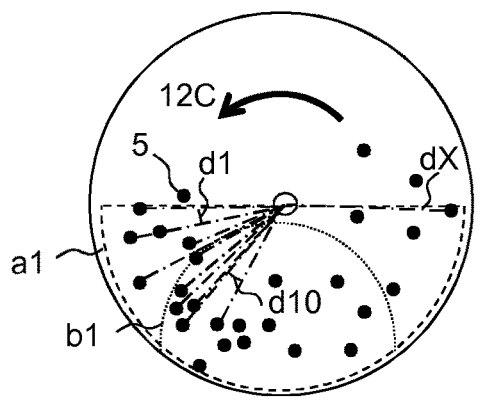
FIG. 6 illustrates distances between objects on the circular conveyor of FIG. 5 according to one embodiment.

As can be seen from FIG. 1, the robots are here arranged along two different parallel linear conveyance paths 4, 6, i.e. a first conveyance path 4 and a second conveyance path 6. However, there may be more conveyance paths than two, e.g. one or more conveyance path for picking and two or more conveyance paths for placing. The first conveyance path 4 and the second conveyance path 6 may be conveyor devices such as belt conveyors, roller conveyors or shooter conveyors or the like with an altitude difference from an inflow side to an outflow side of the conveyor. The first conveyance path 4 and the second conveyance path 6 may of course be different kinds of conveyance paths. The first conveyance path 4 and the second conveyance path 6 are here linear, but may instead be of any other shape, e.g. circular as shown in FIGS. 5 and 6. The first conveyance path 4 is here arranged for transfer of a plurality of items 5 within the working area of each of the robots. The second conveyance path 6 is here arranged for transfer of a plurality of empty places 7 for the items 5 within the working area of each of the robots. The first conveyance path 4 is travelling in a first direction 12A and the second conveyance path 6 is travelling in a second direction 12B. The first direction 12A and the second direction 12B are here the same, thus, the first direction 12A and the second direction 12B are concurrent directions. The first conveyance path 4 and the second conveyance path 6 may instead travel in opposite directions, i.e. countercurrent directions. The first direction 12A and the second direction 12B may in some embodiments not be parallel. Instead, the first direction 12A and the second direction 12B may be angled in respect to each other, e.g. the first conveyance path 4 and the second conveyance path 6 may have perpendicular directions 12A, 12B. Alternatively, a circular conveyance path 17 may be combined with one or several linear conveyance paths 6 as illustrated in FIGS. 5 and 6. A plane 15A, 15B of a conveyance path 4, 6 is the surface where the objects 5, 7 are located. The plane 15A, 15B of a conveyance path 4, 6 may be horizontal or have an altitude difference from an inflow side to an outflow side. Further, the plane 15A, 15B of the conveyance path 4, 6 may have different sections in different geometrical planes, e.g. the plane is first horizontal and then inclines downwards or upwards. The plane 15A of the first conveyance path 4 and the plane 15B of the second conveyance path 6 may be located on the same or different heights.

A first conveyance path controller 4A is arranged to control a motor (not shown) of the first conveyance path 4 based on input data to the first conveyance path controller 4A, in order to control e.g. the velocity and running direction of the first conveyance path 4. A second conveyance path controller 6A is arranged to control a motor (not shown) of the second conveyance path 6 based on input data to the second conveyance path controller 6A, in order to control e.g. the velocity and running direction of the second conveyance path 6. Input data with instructions for setting the velocity and running direction of each conveyance path 4, 6 may be determined and generated by an external computer (not shown) or the robot control system 10, and sent to the conveyance path controllers 4A, 6A, respectively. Alternatively the input data may be given manually to the conveyance path controllers 4A, 6A by an operator of the robot system 11. The velocities and running directions of the conveyance paths 4, 6 may be set in advance to predetermined values. The movement of a conveyance path 4, 6, e.g. the velocity and running direction, may be monitored by the robot control system 10 by receiving input from an encoder (not shown) arranged to the conveyance path 4, 6. In some embodiments, the first conveyance path controller 4A and/or the second conveyance path controller 6A may be an integrated part of any of the robot controllers 1A, 2A, 3A.

The robot system 11 may include a sensor system 8 arranged to monitor the first conveyance path 4 and/or the second conveyance path 6, in order to determine sensor data of the objects 5, 7 on the first conveyance path 4 and/or the second conveyance path 6. The sensor system 8 may include at least one sensor item 8A arranged to monitor the first conveyance path 4 upstream of the most upstream robot of the robots, and/or at least one sensor item 8B arranged to monitor the second conveyance path 6 upstream of the most upstream robot of the robots. A sensor item 8A, 8B may include at least one camera or at least one photoelectric sensor. The sensor system 8 is arranged to acquire two- or three-dimensional images, or binary information, of the objects 5, 7, or of the containers for the objects 5, 7, on the first conveyance path 4 and/or the second conveyance path 6 indicating the positions of the objects 5, 7 and/or the containers. The sensor system 8 may further be arranged to generate sensor data including the images or binary information. The sensor system 8 may further be arranged to determine positions for the objects 5, 7 from the sensor data, and determine position data indicating the positions of the objects 5, 7. The sensor system 8 is further arranged to send the sensor data and/or position data to a robot control system 10 of the robot system 11. The transmission may be performed by wires connecting the sensor system 8 and the robot control system 10, or wirelessly by wireless transmission means. In some embodiments, a sensor item 8A, 8B of the sensor system 8 may be dedicated to and/or arranged to at least one robot in order to monitor the first conveyance path 4 and/or the second conveyance path 6 in the environment of the at least one robot. The sensor system 8 may be an integrated part of the robot controller of the at least one robot. Sensor data from the sensor item 8A, 8B may then be directly available to the robot controller from the sensor item 8A, 8B, and the robot controller recalculates the sensor data into position data for objects 5, 7. Alternatively, the sensor item 8A, 8B may itself calculate the position data, and provide the robot controller with the position data directly. The retrieved sensor data or recalculated position data may from one sensor item 8, 8B may be distributed to robot controllers of any more downstream located robots. In some embodiments, all of the robots may be arranged with a sensor item 8A, 8B each. The sensor system 8 is then distributed over multiple robot controllers 1A, 2A, 3A. Also then, the retrieved sensor data or recalculated position data may be distributed to robot controllers of more downstream located robots. Thus, one robot controller may retrieve sensor data or recalculated position data from a plurality of sources that the robot controller puts together or may compare to get more reliable positions of the objects 5, 7.

According to one embodiment, one sensor item 8A, 8B is arranged in front of each robot. Considering an example where three robots are working along the same conveyance path 4, 6, there is one camera in front of each robot, monitoring objects 5, 7 on the conveyance path 4, 6 the robots are working along. A first sensor item 8A, 8B is located upstream a first robot 1 capturing sensor data of the incoming objects 5, 7 to the first robot 1, and the data from the first sensor item 8A, 8B is only sent to the robot controller 1A of the first robot 1. A second sensor item 8A, 8B captures sensor data of the outgoing objects 5, 7 from the first robot 1, thus the overflow from the first robot 1. Data from the second sensor item 8A 8B is only sent to the second robot 2. A third sensor item 8A, 8B captures sensor data of the outgoing objects 5, 7 from the second robot 2, thus the overflow from the second robot 2. Data from the third sensor item 8A 8B is only sent to the third robot 3. The sensor data may be transformed into position data by the sensor items 8A, 8B before being sent to respective robot controller. According to one embodiment, two or more robots share the same sensor item 8A, 8B. A handshaking between the robot controllers of the two or more robots may then be necessary to inform a downstream one of the two or more robots sharing the same sensor item 8A, 8B which object or objects that have been handled.

Figure 2:
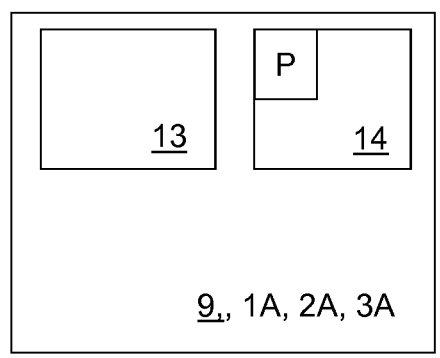
FIG. 2 illustrates a master controller according to one embodiment.

The robot system 11 thus includes the robot control system 10. The robot control system 10 may include a master controller 9 including a processor 13 (FIG. 2) and a memory 14 (FIG. 2). The processor 13 may be made up of one or several CPUs (Central Processing Units). The memory 14 may be made up of one or several memory units. The master controller 9 is arranged to receive the sensor data and/or the position data from the sensor system 8. If the data is sensor data, then the master controller 9 may be arranged to determine positions for objects 5, 7 from the sensor data. The positions may be determined in a common coordinate system for the whole robot system 11. The positions may instead be determined in a coordinate system of the sensor system 8, or a coordinate system of the robot control system 10. However, the master controller 9 may be capable of converting a position for an object 5, 7 into a coordinate that any of the robots can understand or translate into coordinates in its own robot coordinate system. The objects 5, 7 may be located in a container in a predetermined pattern. If the position of the container then is known, the positions of the objects 5, 7 can also be determined by the master controller 9 or the sensor system 8 by mapping the container position with the predetermined pattern. According to one embodiment, the positions of the objects 5, 7 are predetermined and e.g. saved in the memory 14 of the master controller 9.

The functionality of the master controller 9 may instead be incorporated into one of the robot controllers 1A, 2A, 3A, e.g. into the robot controller 1A, 2A, 3A of the most upstream one of the robots. Alternatively, the functionality of the master controller 9 may be incorporated into several, or each, of the robot controllers 1A, 2A, 3A.

In FIG. 1 a common transmission path 16 is illustrated. This transmission path 16 may be wired, or wireless. The transmission path 16 is intended to illustrate that all devices, units, systems and/or controllers of the robot system 11 may be arranged to communicate with each other and to transfer data in-between each other.

The master controller 9 may be arranged to send position data, e.g. positions of the objects 5, 7 in coordinates of a coordinate system of the sensor system 8, to at least one of the robot controllers 1A, 2A, 3A. According to one embodiment, the master controller 9 is arranged to send all position data originating from one sensor item 8A, 8B to all the robot controllers 1A, 2A, 3A of downstream located robots. The position data may be sent as soon as the sensor data has been received to the master controller 9 and the positions have been determined from the sensor data by the master controller 9. The master controller 9 preferably does not resend the same position data multiple times since the robot controllers 1A, 2A, 3A may store received position data e.g. in a queue. If the functionality of the master controller 9 is incorporated into a robot controller 1A, 2A, 3A, the positions of the objects 5, 7 in coordinates of a coordinate system of the sensor system 8 are already available to the robot controller 1A, 2A, 3A. Each robot controller 1A, 2A, 3A is further arranged to convert, i.e. recalculate, a position of an object 5, 7 in the coordinate system of the sensor system 8 into a conveyance path position. That is, a position of an object 5, 7 on the first conveyance path 4 or the second conveyance path 6 is calculated from the position data by using the monitored input from the encoder of the first conveyance path 4 and/or the encoder of the second conveyance path 6, respectively, and a calibrated positional relation between the robot and the first conveyance path 4 or the second conveyance path 6, respectively. The calibrated positional relation or relations, i.e. one relation between each robot and each conveyance path, are typically predetermined and saved in the memory of the robot controller 1A, 2A, 3A of the same robot.

The master controller 9 may thus be arranged to send data to any of the robot controllers 1A, 2A, 3A, and to receive data from the same. The master controller 9 may also be arranged to send data to the conveyance path controllers 4A, 6A and to receive data from the same.

Figure 3:
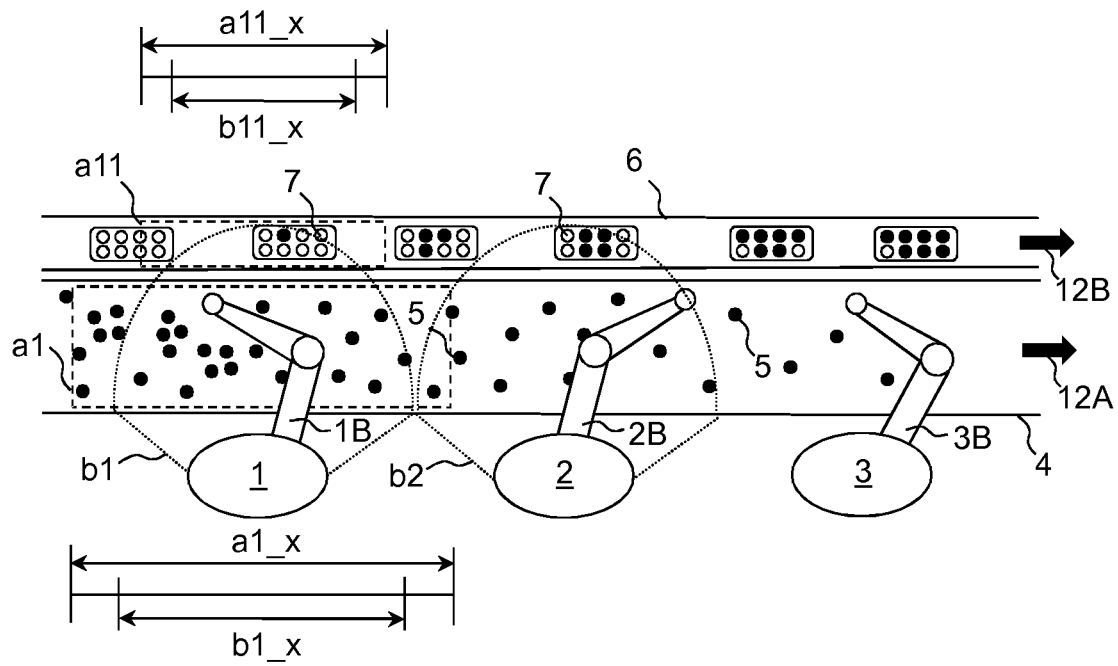
FIG. 3 illustrates examples of working areas of the industrial robots and an examples of certain areas.

In FIG. 3 the same robot system 11 as in FIG. 1 is illustrated in a stripped view, where the robot control system 10, the sensor system 8 etc. are removed for simplicity. The robots are here referred to as a first robot 1 being the most upstream robot, a second robot 2 being the middle robot and a third robot 3 being the most downstream robot of the depicted robots, in relation to the first direction 12A. Each robot is capable of working within a working area, typically formed as a globe around the robot and here schematically depicted as a semi-circle b1, b2 in the planes 15A, 15B of both of the first conveyance path 4 and the second conveyance path 6. For simplicity the working area of the third robot 3 is not depicted, but it is understood that the third robot 3 has a similar working area as the other robots, and this working area is in the following referred to as b3. A working area may be defined within an area restricted by the positions that a robot tool 1C, 2C, 3C of a robot can reach in space by moving the arm 1B, 2B, 3B of the robot that is, moving the different robot joints of the robot. The working area may thus be defined to be the whole area that a robot can reach with its robot tool 1C, 2C, 3C, or be defined to be a smaller reduced area within this whole area. A smaller area may be useful, e.g. if the movements of the robot have to be limited temporarily or constantly, e.g. to not collide with any adjacent robot or structure.

In FIG. 3 there are also two certain areas a1, a11 for the first robot 1 depicted, one certain area a1 on the first conveyance path 4 and a further certain area a11 on the second conveyance path 6 which use will be further explained in the following. It should be understood that each robot may have a dedicated certain area on each conveyance path 4, 6 however for simplicity not all are depicted in the FIG. 3. Thus, the second robot 2 has one certain area a2 (not shown in FIG. 3) on the first conveyance path 4 and a further certain area a22 (not shown in FIG. 3) on the second conveyance path 6. The third robot 3 has one certain area a3 (not shown) on the first conveyance path 4 and a further certain area a33 (not shown) on the second conveyance path 6. A certain area for a robot includes the part of the working area for the same robot that is on the conveyance path 4, 6.

In FIG. 5 an example of a stripped robot system 11 according to another embodiment is shown. Some of the reference numbers in FIG. 5 have been previously used for the same features in the previous figures, and reference is made to the previous description for these features. In FIG. 5, the first robot 1 and the second robot 2 are shown working along a same circular conveyance path 17. A rotational third direction 12C of the circular conveyance path 17 is here counterclockwise. The third direction 12C may instead be clockwise. On the other side of the first robot 1 there is a linear second conveyance path 6 running in a fourth direction 12D. On the other side of the second robot 2 there is another linear second conveyance path 6 running in a fifth direction 12E. The first robot 1 and the second robot 2 are arranged to pick items 5 from the circular conveyance path 17 and to place them in empty spaces 7 on the second conveyance paths 6, respectively. The inflow of items 5 on to the circular conveyance path 17 is just before the working area b1 for the first robot 1 starts. The first robot 1 will thus be given the largest number of items 5, just as in the example illustrated in FIG. 1. The first robot 1 is thus also here the most upstream robot of the first robot 1 and the second robot 2, in relation to the rotation direction of the circular conveyance path 17. A control system, sensor system, conveyance path controllers, robot controllers, master controller etc are not illustrated here for simplicity, but it should be understood that the same robot control system 10, sensor system 8, conveyance path controllers 4A, 6A, master controller 9 and transmission path 16 for communication etc. may be used as illustrated in FIGS. 1-2 and previously explained. Also, a further conveyance path controller for the second conveyance path 6 running in the fifth direction 12E is not illustrated, but is understood to be included in the robot system 11. The certain area a1, a2 on the circular conveyance path 17 for each of the first robot 1 and the second robot 2 is here a semi-circle of the circular conveyance path 17, but could have another size of a circle sector. The certain area a1 for the first robot 1 should include at least part of the working area b1 of the first robot 1, and the certain area a2 for the second robot 2 should include at least part of the working area b2 of the second robot 2, respectively. The certain area a11, a22 of any of the other second linear conveyance paths 6 also includes at least part of a respective working area b1, b2.

The robot control system 10 (FIG. 1) is configured to execute a method for controlling handling of objects 5, 7 on any of the first conveyance paths 4, 17 and/or second conveyance paths 6 and/or other conveyance paths. The memory 14 (FIG. 2) includes a computer program P with program code to cause the master controller 9, or a computer or controller, e.g. robot controller 1A, 2A, 3A connected to the master controller 9, or including the functionality of the master controller 9, to perform the method that will be explained in the following. The program code may be stored on a separate computer-readable medium, and loaded into the master controller 9 and/or the computer or controller 1A, 2A, 3A connected to or including the functionality of the master controller 9.

Figure 7:
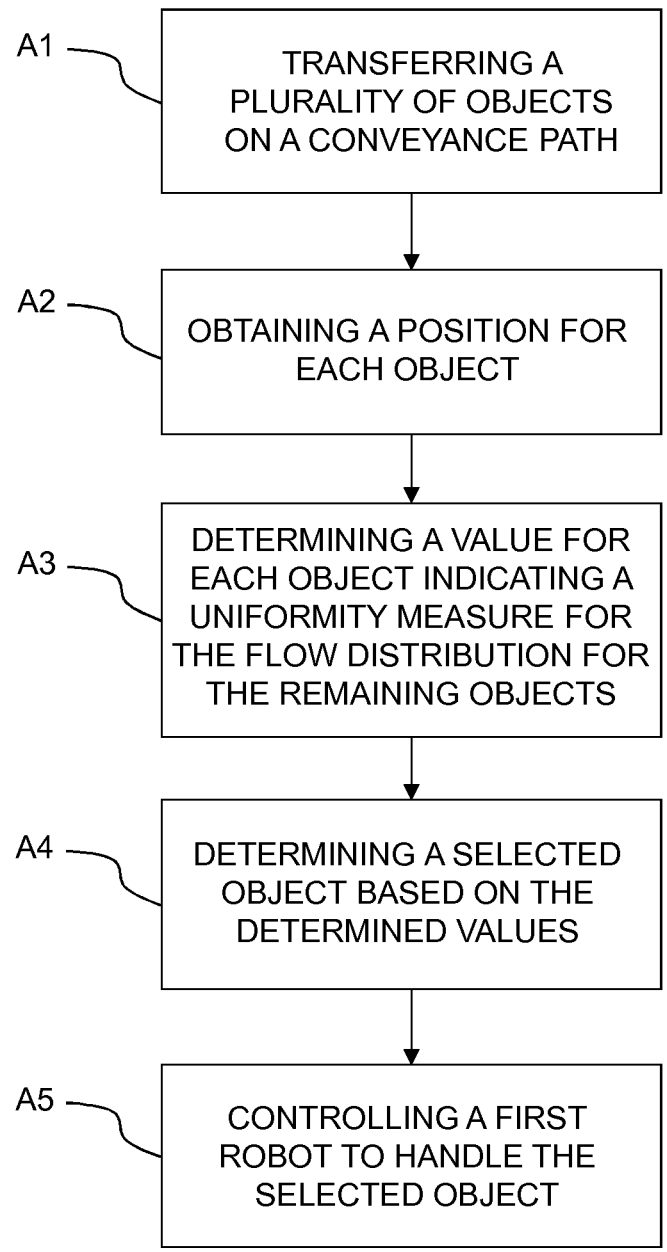
FIG. 7 illustrates a flow chart for a method according to one embodiment of the disclosure.

The method will now be explained with reference to the flowchart in FIG. 7, and to the illustrations in FIGS. 4 and 6. The method may be implemented on and by the robot system 11 illustrated in FIGS. 1, 3 and 5. The method includes in a step A1 to transfer a plurality of objects 5, 7 within a working area b1, b2, b3 of at least one robot. The flow of objects 5, 7 is here fluctuating. The transfer may be made with one or several of the illustrated conveyance paths 4, 6, 17. In a step A2 the position data indicating a position for each of the plurality of objects 5, 7 are obtained. They may be readily available from the memory 14, sent from the sensor system 8 or determined by the robot control system 10, e.g. the master controller 9 or any of the robot controllers 1A, 2A, 3A, based on sensor data from the sensor system 8. The steps A1 and A2 are continuously performed, such that the robot control system 10 continuously has the positions of the objects 5, 7 on the respective conveyance path or conveyance paths 4, 6, 17 available.

The method is further applying a first strategy to at least one of the robots, here represented by the first robot 1, but the first strategy could be applied to any of the robots. The first strategy includes in a step A3 determining a value for each object 5, 7 within the certain area a1 of the first robot 1. The determination is based on the position data, and the value indicates a uniformity measure of the flow distribution in a direction of the conveyance path 4, 6, 17 for the remaining objects 5, 7 within the certain area a1 if the object, for which the value is determined for, was excluded from the conveyance path 4, 6, 17. A certain area a1, a2, a3, a11, a22, a33 may include either the first conveyance path 4, the second conveyance path 6 or the circular conveyance path 17, depending of if the first strategy is applied when the first conveyance path 4 is used, if the first strategy is applied when the second conveyance path 6 is used, or if the first strategy is applied when the circular conveyance path 17 is used, respectively. If the first strategy is applied when the first conveyance path 4 is used, the certain area a1, a2, a3 includes the first conveyance path 4, 17. If the first strategy is applied when the second conveyance path 6 is used, the certain area a11, a22, a33 includes the second conveyance path 6. If the first strategy is applied when the circular conveyance path 17 is used, the certain area a1, a2, a3 includes the circular conveyance path 17. The certain area a1, a2, a3, a11, a22, a33 typically includes an area slightly greater than the area of the part of the working area b1, b2, b3 for a robot that is on the conveyance path 4, 6, 17, respectively.

In a further step A4 the method includes determining a selected object within the working area b1 of the first robot based on the determined values. Within the working area here means within the working area at the time of handling the selected object. As the conveyance path 4, 6, 17 is in motion, the working area in relation to the conveyance path 4, 6, 17 of a robot is continuously changing. In a still further step A5 the method includes controlling the first robot to handle the selected object. When a selected object has been determined, the robot controller 1A controls the first robot 1 to handle the selected object.

The step of determining a value for each object 5, 7 (step A3) and the step of determination of the selected object 5, 7 (step A4) may be made by the robot controllers 1A, 2A, 3A (FIGS. 1-2), respectively, since the robot controllers 1A, 2A, 3A have access to all object positions in its queue. The robot controllers 1A, 2A, 3A then may make the selection for every handling cycle, where a handling cycle includes to apply step A3 and A4 once, based on the position data received from the master controller 9 and based on updates of the position data received from any upstream robots via the master controller 9. Since the object handling is redundant, the robot controllers 1A, 2A, 3A may determine any object 5, 7 to be the selected object 5, 7 with a position within reach at the time of handling.

Alternatively, the step of determining a value for each object 5, 7 (step A3) and the step of determination of the selected object 5, 7 (step A4) may be made by the master controller 9. The master controller 9 then sends input data to the robot controller 1A indicating the position of the object 5, 7 that has been determined to be the selected object. The controller 1A then controls the first robot 1 to handle the selected object.

The time of handling is a time after the determination of a selected object is made, and should be timed such that a robot has time to move its arm 1B, 2B, 3B and handle the selected object e.g. pick, place or process the selected object, before the object 5, 7 is outside the working area b1, b2, b3 of the robot. Thus, the time of handling the object 5, 7 should be synchronized with the position of the object 5, 7 on the conveyance path 4, 6, 17; the working area b1, b2, b3 of the robot on the conveyance path 4, 6, 17, respectively; the velocity of the conveyance path 4, 6, 17 or a corresponding parameter, and the time the robot need to reach out to the object 5, 7 and pick, place or process the object 5, 7. The time of handling is thus typically a future time that incorporates the time the robot needs to handle the object 5, 7.

The method further includes saving the position data and updating the position data when a selected object has been handled such that the position data always includes only the positions for the objects 5, 7 not previously being handled. For example, the position data is updated directly in the robot controller 1A when the first robot 1 has handled the selected object. Also, when the first robot 1 has handled the selected object, the robot controller 1A of the first robot 1 makes a handshaking with the master controller 9 that the selected object has been handled. The selected object and its position may then be removed from the position data of the master controller 9. The handshaking may include that the position of the selected object and/or a message that this object has been handled may be sent from the controller 1A to the master controller 9. It should be understood that the position data may be updated in a way such that the positions of the objects that have been handled are denoted being no more available, such they cannot be used by the robot control system 10, e.g. any of the robot controllers 1A, 2A, 3A, but are still present in the position data. However, the position of the handled object 5, 7 may alternatively be removed from the position data. If a plurality of robots are included in the robot system 11, the position data may be updated also based on handshaking from the other robots in the same way as with the first robot 1. The message may then be sent from the robot controller 1A of the first robot 1 via the master controller 9, or directly, to any other robot controller 2A, 3A of another robot 2, 3, or to all robot controllers 2A, 3A of the robots that are located downstream of the first robot 1.

Figure 4:
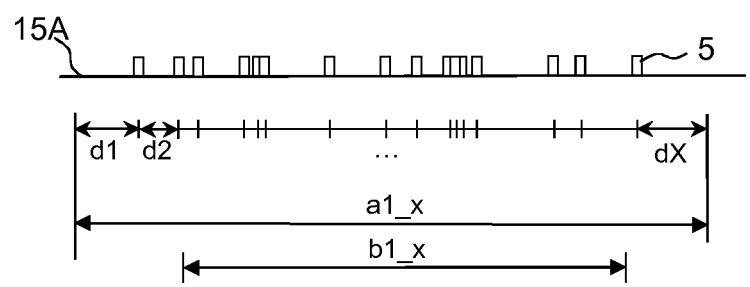
FIG. 4 illustrates distances between objects on the first conveyance path of FIG. 3 according to one embodiment.

Turning now to FIGS. 4 and 6, and with reference to these illustrations, the steps A3 and A4 will be exemplified in order to explain the steps in more in detail. In FIG. 4 a side view of the horizontal plane 15A of the first conveyance path 4 is shown, where the items 5 are distributed. Here the distribution among the consecutive items 5 is illustrated, and the distances between each pair of consecutive items 5 are denoted d1, d2 . . . dX. The distances a1_x and b1_x along the plane 15A extends in the same direction as the first direction 12A (FIG. 3) of the first conveyance path 4. The distance a1_x is the largest extension of the certain area a1 of the first robot 1 in the first direction 12A. The distance b1_x is the largest extension of the working area b1 of the first robot 1 in the first direction 12A. The distance b1_x varies in the direction perpendicular to the first direction 12A as can be seen from FIG. 3, but is here for simplicity illustrated as constant. The distance a1_X is here at least of the same size as the distance b1_X. Here, the distance d1 is the distance from the last border of the certain area a1 to the position of a last item 5 within the certain area a1, and the distance dX is the distance from a first item 5 to an opposite first border of the certain area a1, all with reference to the first direction 12A. The distance between the last border and the first border is thus a1_x. If the certain area a1 is made connected at two ends, such that the distance d1 meet distance dX, the distance between the first object and the last object within the certain area a1 becomes d1+dX. As a position for every item 5 is known from the position data, the robot controller 1A or the master controller 9 can calculate the distances between each pair of consecutive items 5 in the first direction 12A. The distance a1_x is according to one embodiment constant when applying the first strategy.

In FIG. 6 the circular conveyance path 17 of FIG. 5 is illustrated in a stripped view. As the circular conveyance path 17 has a circular shape, the consecutive distances d1, d2 . . . dX may instead be angular distances, e.g. 5°, 3° etc. between each pair of consecutive items 5. Hatched lines are plotted from the circle center of the circular conveyance path 17 to the items 5 for ease of understanding, and it is the angular distances between consecutive hatched lines in the rotation direction 12C that are determined. The angular distances may be expressed in degrees or radians. In the figure the distances d1, d10 and dX are illustrated, but it should be understood that all angular distances d1 . . . dX between each pair of consecutive objects, here items 5, should be determined. The robot controller 1A, or master controller 9, is then configured to determine the angular distances between each pair of consecutive items 5 based on the positions of the items 5.

Based on the distances, the method may now determine the value for each item 5 within the certain area a1 of the first robot. A value may be a standard deviation according to:

$$\sigma = \sqrt{\frac{1}{N-1} \cdot \sum_{i=1}^{N} (x_i - \mu)^2} \qquad (1)$$

where N is the number of distances d between each pair of consecutive items 5, $x_i$ is the i:th distance d, and μ is the average distance of the N distances d. The average distance μ is calculated according to:

$$\mu = \frac{1}{N} \sum_{i=1}^{N} x_i \qquad (2)$$

A value may alternatively be based on the standard deviation, e.g. a variance Var(d) of the distances d according to:

$$\text{Var}(d) = \sigma^2 \qquad (3)$$

The method then includes calculating a value, e.g. a variance, of the consecutive distances d1+dX, d2 . . . d(X−1) for each item 5, if the item 5, for which the value is determined for, was excluded from the conveyance path 4, 17. Thus, for each item 5, a value is calculated when this particular item is excluded from the position data, and its position is no longer taken into account. This is done for each of the items 5 within the certain area a1. The distance d1 and distance dX are used to be able to have the same reference length (d1+dX)+ . . . +d(X−1) for the calculations of a value for each item 5 within a certain area as previously explained. With other words, independent of which item 5 that is excluded in the calculations, the same average distance μ can be calculated. According to one embodiment, only a value for each item 5 within the working area b1 of the first robot 1, at a future estimated time of handling, is determined. As the first robot 1 can only reach objects 5, 7 within its working area b1 this embodiment may speed up the calculation process as less calculations have to be made. The value thus indicates a uniformity measure of the flow distribution in the direction of the conveyance path 4, 6, 7 for the remaining items 5 that have not yet been handled, thus, the remaining items 5 within the certain area a1 if the item 5, for which the value is determined for, was excluded from the conveyance path 4, 17. The flow distribution is defined to be the locations of a set of objects 5, 7, here items 5, on a conveyance path in the direction of the conveyance path. It is desired that this flow distribution is as uniform as possible. The most optimal flow distribution is when each distance between each pair of consecutive objects 5, 7 is equal to μ calculated by equation (2) and is thus equal to the average distance of the N distances. The flow distribution then is as uniform as possible, and the variance is zero. With other words, when the distances between each pair of consecutive objects 5, 7 in the direction of the conveyance path on which the objects 5, 7 are located, within an area have the same size, the flow distribution of the objects 5, 7 within this area in the direction of the conveyance path 4, 6, 17 is as uniform as possible. It is thus desired that the distances between each pair of consecutive objects 5, 7 in the direction of the conveyance path are as close to the average distance μ as possible.

For determining the selected object the method may include comparing the plurality of values and determining the object 5, 7 with the lowest value to be the selected object. Thus, if a variance has been determined for each item 5, the variances are compared and the item 5 with the variance with the lowest value is selected as the selected item 5. If this item 5 is handled by the first robot 1, e.g. picked, then afterwards the flow distribution in the respective direction 12A, 12C will be the most uniform possible for the remaining items 5 within the certain area a1. In other words, the selected item within the working area b1 of the first robot 1 is determined to be the item 5 whose exclusion gives the most uniform flow distribution for the remaining items 5 in the direction of the conveyance path 4, 6, 17 within the certain area a1 based on the determined values.

If the certain area a1, a2, a3, a11, a22, a33 included on a conveyance path 4, 6, 17 is greater than and includes the working area b1, b2, b3 on the same conveyance path 4, 6, 17, an object 5, 7 may be determined to be a selected object 5, 7 that would not have been determined to be the selected object if the certain area a1, a2, a3, a11, a22, a33 had the same area as the working area b1, b2, b3. For determining a uniformity measure of the flow distribution, objects 5, 7 outside the working area b1, b2, b3 but inside the certain area a1, a2, a3, a11, a22, a33, respectively, may be included in the calculations. Then also objects 5, 7 e.g. close to the border of the working area b1, b2, b3, but within the working area b1, b2, b3, may be chosen to be the selected object that would not have been chosen if only objects 5, 7 within the working area b1, b2, b3 had been included. Thereby the overall flow distribution of the objects 5, 7 on the conveyance path 4, 6, 17 may be made more uniform.

The method may include to repeatedly making the first robot 1 to perform the steps of the first strategy. The first strategy may be applied to a plurality of other robots within the robot system 11 working for the same task along the same conveyance path or paths 4, 6, 17.

The first strategy has hereinbefore mostly been explained with reference to the first conveyance path 4 or the circular conveyance path 17 and items that should be picked. It should be understood that the method may be applied to any flow, for example for filling empty places 7 on the second conveyance path 6. Then, distances d between the empty places 7 will be determined, and values for each empty place 7. In the explanation in conjunction with the steps A3 and A4, the distance a1_x is then exchanged for the distance a11_x, and the distance b1_x is exchanged for b11_x (FIG. 3) in the above explained method, when applied for the first robot 1 in FIGS. 1 and 3. The distances a11_x and b11_x along the plane 15B extends in the same direction as the second direction 12B (FIG. 3) of the second conveyance path 6. The distance a11_x is the largest extension of the certain area a11 for the first robot 1 in the second direction 12B. The distance b11_x is the largest extension of the working area b11_x of the first robot 1 in the direction 12B. The distance b11_x varies in the direction perpendicular to the running direction 12B as can be seen from FIG. 3, but is here for simplicity illustrated as constant. The items 5 are then exchanged for empty spaces 7. A selected empty space is determined by comparing the values, and e.g. the empty space 7 whose exclusion (from the position data) gives the most uniform flow distribution for the remaining empty spaces 7 is chosen.

Thus, the same method steps of the first strategy are applied when determining which empty space 7 to be filled first, as when determining which item 5 to be picked or processed first. The empty spaces 7 may reside in a container for items 5 in a pattern as on the second conveyance path 6. Even with constant distances between containers and a uniform pattern in the container, the empty places 7 are normally not uniformly distributed over the robot's working area b1, b2, b3 on the second conveyance path 6. It is typically advantageous to start placing in the middle of the container pattern to make the distribution more uniform. If the pattern has several layers, the fill order becomes restricted, but the method can still be used to prioritize filling the empty places 7. The filling performance will thereby be increased.

The first strategy may thus be applied to the same robot for two or more different conveyance paths 4, 6, 17. For example, the robot may first be controlled to pick an item 5 at the first conveyance path 4 or the circular conveyance path 17 according to the first strategy applied to the items 5 of the respective conveyance path 4, 17, and thereafter the robot may place the item 5 at an empty place 7 such that the empty space 7 becomes filled using the first strategy applied to the empty spaces 7 on a second conveyance path 6.

According to one embodiment, the method may include to apply a second strategy to the most downstream one of the plurality of robots, the second strategy being different from the first strategy. In FIGS. 3 and 4 it is the third robot 3 that is the most downstream robot, and in FIG. 5 it is instead the second robot 2 that is the most downstream robot. The second strategy may for example include to always prioritizing the most downstream object 5, 7 in the working area b2, b3 of the most downstream robot at the time of handling. Then, the final overflow of objects 5, 7 can be minimized, and thus minimized for the whole robot system 11. Alternatively, the second strategy may include to make the most downstream robot prioritize, i.e. handle, the object 5, 7 that leaves the working area b2, b3 of the most downstream robot first. For example, if the working area b2, b3 has a curvature, some objects 5, 7 will leave the working area b3 sooner than other objects 5, 7 as they are further away from the mounting positions of the robots than other objects 5, 7, that is, they will remain in the working area b2, b3 a shorter time period than other objects 5, 7. These objects 5, 7 may then be handled before other objects 5, 7 that will remain in the working area b2, b3 for a longer time period. The second strategy is applied to the most downstream robot as long as the method is executed.

If any additional robot or robots exist upstream of the most downstream robot other than the first robot 1, the first strategy may be applied to this robot or these robots too. For example, in FIGS. 1 and 3 there is a second robot 2 in between the first and the third robots 1, 3, and the first strategy may be applied to this second robot 2 too. The first robot 1 and the second robot 2 will thus give a more uniform flow of items 5 that the third robot 3 can pick and place. Thus, upstream robots will prioritize clustered objects 5, 7 over single objects 5, 7. They will handle objects 5, 7 all over the working areas b1, b2 targeting heaps of clustered objects 5, 7. They will maintain a high handling rate, handling any object 5, 7 within reach, but the selection is optimized to minimize fluctuations of the outgoing flow. The incoming flow to the most downstream robot will become more uniform, giving it better time margins to handle every object 5, 7. Thus, the outgoing flow from the most downstream robot will be reduced, i.e. the number of objects 5, 7 on the conveyance path 4, 6 downstream of the most downstream robot and outside the working area of the most downstream robot will be reduced. The handling rate of the third robot will increase since the average waiting time for incoming objects 5, 7 for handling is reduced.

The first strategy may of course be applied to a robot both for items 5 on the first conveyance path 4 or the circular conveyance path 17, and for empty spaces 7 on the second conveyance path 6. For example, a selected item 5 may first be determined on the first conveyance path 4 and the robot picks the selected item 5, a selected empty place 7 is determined, and the robot places the item 5 at the selected empty place position. Thus, the first strategy may be applied separately to different conveyance paths 4, 6, 17 for the same robot, simultaneously, or after each other in time.

Objects 5, 7 on one conveyance path 4, 6, 17 may be different kinds of objects 5, 7, e.g. apples and pears. The first strategy may then include to separate the different kinds of objects 5, 7 on the same conveyance path 4, 6, 17 into separate sets of objects 5, 7, and apply the method steps of the first method to the objects 5, 7 of one or several sets as the other set or sets were not present on the same conveyance path 4, 6. For example, different robots may handle different sets of objects 5, 7. The master controller 9 may mark up the position data of an object 5, 7 according to which set of objects it belongs. The marked up position data is sent to all robot controllers 1A, 2A, 3A. The marked up position data of all objects 5, 7 may be sent to all robot controllers 1A, 2A, 3A. Different kinds of strategies may then be applied to different sets of objects directly by the robot controllers 1A, 2A, 3A. For example, the first strategy may be applied to one kind of objects 5, 7 on one conveyance path 4, 6, 17 and the second strategy may be applied to another kind of objects 5, 7 on the same conveyance path 4, 6, 17.

In the figures the first conveyance path 4 and the circular conveyance path 17 carry items 5, and the second conveyance paths 6 carry empty spaces 7. However, there may be more conveyance paths within the working area b1, b2, b3 of the at least one robot that have the same capabilities as the other previously explained conveyance paths 4, 6, 17. A third conveyance path (not shown) may for example be located on the opposite side of the robots as the first conveyance path 4 and the second conveyance path 6 in FIGS. 1 and 3. Depending on the type of objects on the third conveyance path, the first strategy may be applied separately to the objects on the third conveyance path, that is, to all objects on it, or to a group of objects on it.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A computer implemented method for a system including at least one industrial robot arranged with a tool and a conveyance path transferring a plurality of objects within a working area of the at least one robot, wherein the computer implemented method includes obtaining position data indicating a position for each of the plurality of objects and applying a first strategy to the at least one robot, the first strategy including:
    determining a value for each object within a certain area wherein the determination is based on the position data, and the value indicates a uniformity measure of the flow distribution in a direction of the conveyance path for the remaining objects within the certain area if the object, for which the value is determined for, was excluded from the conveyance path;
    determining a selected object within the working area of the at least one robot based on the determined values;
    controlling the at least one robot to handle the selected object.

2. The method according to claim 1, including saving the position data and updating the position data when a selected object has been handled such that the position data always includes only the positions for objects not previously being handled.

3. The method according to claim 2, including determining the selected object within the working area of the at least one robot to be the object whose exclusion gives the most uniform flow distribution in the direction of the conveyance path for the remaining objects within the certain area based on the determined values.

4. The method according to claim 2, including repeatedly making the at least one robot perform the steps of the first strategy.

5. The method according to claim 2, wherein the system includes a most downstream robot in relation to the direction of the respective conveyance path, wherein the method includes applying a second strategy to the most downstream robot, the second strategy being different from the first strategy.

6. The method according to claim 2, wherein the determining a value for each object includes:
    determining distances between objects in the direction of the respective conveyance path from the position data; and
    calculating a variance of the distances for each object, if the object, for which the value is determined for, was excluded from the conveyance path; and wherein the determining the selected object includes:
    comparing the plurality of values; and
    determining the object with the lowest value to be the selected object.

7. The method according to claim 2, including applying the first strategy separately to different conveyance paths for the same at least one robot.

8. The method according to claim 1, including determining the selected object within the working area of the at least one robot to be the object whose exclusion gives the most uniform flow distribution in the direction of the conveyance path for the remaining objects within the certain area based on the determined values.

9. The method according to claim 1, including repeatedly making the at least one robot perform the steps of the first strategy.

10. The method according to claim 1, wherein the system includes a most downstream robot in relation to the direction of the respective conveyance path, wherein the method includes applying a second strategy to the most downstream robot, the second strategy being different from the first strategy.

11. The method according to claim 10, including always prioritizing the most downstream object in the working area of the most downstream robot.

12. The method according to claim 1, wherein the determining a value for each object includes:
   determining distances between objects in the direction of the respective conveyance path from the position data; and
   calculating a variance of the distances for each object, if the object, for which the value is determined for, was excluded from the conveyance path; and wherein the determining the selected object includes:
   comparing the plurality of values; and
   determining the object with the lowest value to be the selected object.

13. The method according to claim 1, including applying the first strategy separately to different conveyance paths for the same at least one robot.

14. A system including at least one industrial robot arranged with a tool; a conveyance path arranged for transfer of a plurality of objects within a working area of the at least one robot; a control system including processing means and memory means; wherein the control system is arranged to obtain position data indicating a position for each of the plurality of objects wherein the control system is configured to execute the method according to claim 1.

15. The system according to claim 14, further including a sensor system arranged to monitor the conveyance path, generate sensor data indicating each of the plurality of objects, send the sensor data to the control system, wherein the control system is configured to determine positions for each of the plurality of objects based on the sensor data, and generate the position data indicating the positions.

16. The system according to claim 14, including a robot controller with a processor and a memory, wherein the robot controller is configured to perform the steps of the first strategy.

17. The system according to claim 14, including a robot controller with a processor and a memory, wherein the robot controller is configured to perform the steps of the first strategy.

* * * * *